US012747051B2

(12) United States Patent
Dietz

(10) Patent No.: US 12,747,051 B2
(45) Date of Patent: Sep. 29, 2026

(54) SLICED RARE, MEDIUM RARE AND MEDIUM COOKED ROAST BEEF IN MODIFIED ATMOSPHERE PACKAGING

(71) Applicant: Cargill, Incorporated, Wayzata, MN (US)

(72) Inventor: Garret John Dietz, Mount Hope, KS (US)

(73) Assignee: Cargill, Incorporated, Wayzata, MN (US)

( * ) Notice: Subject to any disclaimer, the term of this patent is extended or adjusted under 35 U.S.C. 154(b) by 960 days.

(21) Appl. No.: 17/769,541

(22) PCT Filed: Oct. 15, 2020

(86) PCT No.: PCT/US2020/055790
§ 371 (c)(1),
(2) Date: Apr. 15, 2022

(87) PCT Pub. No.: WO2021/076763
PCT Pub. Date: Apr. 22, 2021

(65) Prior Publication Data

US 2024/0059440 A1 Feb. 22, 2024

Related U.S. Application Data

(60) Provisional application No. 63/091,414, filed on Oct. 14, 2020, provisional application No. 62/916,844, filed on Oct. 18, 2019.

(51) Int. Cl.
*B65B 25/06* (2006.01)
*A23B 2/721* (2025.01)
(Continued)

(52) U.S. Cl.
CPC ............ *B65B 25/067* (2013.01); *A23B 2/721* (2025.01); *A23B 4/16* (2013.01); *A23L 5/15* (2016.08);
(Continued)

(58) Field of Classification Search
CPC . A23B 4/16; A23B 2/721; A23L 13/77; A23L 5/15; A23L 13/75; B65D 81/2084; B65B 25/067
See application file for complete search history.

(56) References Cited

U.S. PATENT DOCUMENTS 2,810,944 A 10/1957 Sander
3,220,854 A 11/1965 Zwart
(Continued)

FOREIGN PATENT DOCUMENTS

AU 2018247919 A1 10/2019
CN 1993053 A 7/2007
(Continued)

OTHER PUBLICATIONS http://lib3.dss.go.th/fulltext/scan_ebook/j.food_pre_1987_v11_n2.pdf Journal of Food Processing and Preservation vol. 11 No. 2 pp. 171-179 Hintlian et al Microbiological and Sensory Evaluation of Cooked Roast Beef Packaged in a Modified Atmosphere (Year: 1987).*

(Continued)

*Primary Examiner* — Vera Stulii

(57) ABSTRACT

A method for providing long-shelf life sliced rare, medium rare, and medium cooked roast beef comprises providing whole beef portions; cooking the whole beef portions to an internal temperature of from about 130 to 160° F. to form cooked roast beef portions; slicing the cooked roast beef portions to form sliced cooked roast beef having an average thickness of from about 0.5 mm to 10 mm; disposing the
(Continued)

sliced cooked roast beef into a trayless gas impermeable package formed from flexible film, flushing the trayless gas impermeable package with an inert gas comprising carbon dioxide, nitrogen, and from about 0.1% to about 30% carbon monoxide; and sealing the trayless gas impermeable package. Packaged sliced rare, medium rare, and medium cooked roast beef provided in trayless gas impermeable packages in an inert gas comprising carbon dioxide, nitrogen, and from about 0.1% to about 30% carbon monoxide are also described.

14 Claims, 7 Drawing Sheets

(51) Int. Cl.
*A23B 4/16* (2006.01)
*A23L 5/10* (2016.01)
*A23L 13/75* (2023.01)
*A23L 13/77* (2023.01)
*B65D 81/20* (2006.01)

(52) U.S. Cl.
CPC ............... *A23L 13/75* (2023.01); *A23L 13/77* (2023.01); *B65D 81/2084* (2013.01)

(56) References Cited

U.S. PATENT DOCUMENTS

| | | | |
|---|---|---|---|
| 3,459,117 | A | 8/1969 | Koch et al. |
| 4,360,551 | A | 11/1982 | Guarino et al. |
| 5,138,750 | A | 8/1992 | Gundlach et al. |
| 5,372,428 | A | 12/1994 | Bruno et al. |
| 6,004,032 | A | 12/1999 | Kapperman et al. |
| 6,025,079 | A | 2/2000 | Ciocca et al. |
| 6,113,962 | A | 9/2000 | Spencer |
| 6,749,910 | B1 | 6/2004 | Georgelos et al. |
| 7,029,178 | B2 | 4/2006 | Gzybowski |
| 7,935,373 | B2 | 5/2011 | Brackenridge |
| 8,053,047 | B2 | 11/2011 | Siegel et al. |
| 8,158,176 | B2 | 4/2012 | Steiner |
| 8,314,286 | B2 | 11/2012 | Drzewiecki et al. |
| 8,357,414 | B2 | 1/2013 | Becraft |
| 8,709,595 | B2 | 4/2014 | Siegel et al. |
| 8,741,433 | B2 | 6/2014 | Schell et al. |
| 10,172,366 | B2 | 1/2019 | Huebner et al. |
| 10,618,260 | B2 | 4/2020 | Peiffer et al. |
| 2003/0054073 | A1 | 3/2003 | Delduca et al. |
| 2006/0073244 | A1 | 4/2006 | Brackenridge et al. |
| 2006/0147586 | A1 | 7/2006 | Tewari |
| 2006/0233985 | A1 | 10/2006 | Pockat et al. |
| 2006/0286323 | A1 | 12/2006 | Siegel et al. |
| 2007/0275134 | A1 | 11/2007 | Siegel et al. |
| 2007/0298273 | A1 | 12/2007 | Thies et al. |
| 2009/0092717 | A1 | 4/2009 | Steiner |
| 2009/0130276 | A1 | 5/2009 | Voisin et al. |
| 2016/0114958 | A1 | 4/2016 | Busche et al. |
| 2016/0152390 | A1 | 6/2016 | Itoh et al. |
| 2019/0375200 | A1 | 12/2019 | Kitada et al. |
| 2019/0389187 | A1 | 12/2019 | Peiffer et al. |

FOREIGN PATENT DOCUMENTS

| | | | |
|---|---|---|---|
| CN | 102599228 | A | 7/2012 |
| EP | 0118314 81 | | 12/1986 |
| EP | 2055651 | A1 | 5/2009 |
| EP | 3470344 | A1 | 4/2019 |
| WO | 2005122774 | A2 | 12/2005 |
| WO | 2015/002963 | A1 | 1/2015 |
| WO | 2015/189351 | A1 | 12/2015 |
| WO | 2018/185235 | A1 | 10/2018 |
| WO | 2019/002107 | A1 | 1/2019 |
| WO | 2021/154776 | A1 | 8/2021 |

OTHER PUBLICATIONS

Database FSTA [online] International Food Information Service (IFIS), Frankfurt-Main, DE; 2017, Salzgeber C: "well-packaged quickly sold." XP002802859, Database accession No. FS-2017-09-Sa3616 abstract.

Database GNPD Mintel; anonymous: "Parma Ham" , XP055800352, Database accession No. 1512997, Mar. 24, 2011, pp. 1-2.

Farber, J. M., "Microbiological Aspects of Modified-Atmosphere Packaging Technology—A Review", Journal of Food Protection, vol. 54. No. 1, Jan. 1991, pp. 58-70.

GBPI Testing Instruments, "WVTR and OTR testing, the key for choosing a suitable packaging film", retrieved from the Internet: <URL: https://www.gbpitester.com/blog/wvtr-and-otr-testing-the-keyfor- choosing-a-suitable-packaging-film_b6>, Feb. 21, 2019, 3 pages.

Hintlian, C. B. et al., "Comparative Growth of Spoilage and Pathogenic Organisms on Modified Atmosphere-Packaged Cooked Beef", Journal of Food Protection, vol. 50, No. 3, Mar. 1, 1987, pp. 218-223.

John, L. et al., "Color and thiobarbituric acid values of cooked top sirloin steaks packaged in modified atmospheres of 80% oxygen, or 0.4% carbon monoxide, or vacuum", Meat Science, vol. 69, No. 3, Mar. 1, 2005, pp. 441-449.

Kantor, L. S. et al., "Estimating and Addressing America's Food Losses" Food Review, Jan.-Apr. 1997, pp. 1-11.

Stable Micro Systems, "How to Measure Flexibility and Bending Force", retrieved from the Internet: <URL: https://web.archive.org/web/20210801110434/https://stablemicrosystems.com/measure-material-flexibility.html>, 2020, 4 pages.

The Interagency Retail Listeria monocytogenes Risk Assessment Workgroup, USDA, "Interagency Risk Assessment: Listeria monocytogenes in Retail Delicatessens" retrieved from the Internet: <https://www.fsis.usda.gov/wps/wcm/connect/c0c6dfbc-ad83-47c1-bcb8-8db6583f762b/Lm-Retail-Technical-Report.pdf?MOD=AJPERES>, Sep. 2013,175 pages.

U.S. Department of Agriculture (USDA), "Food Waste FAQs" retrieved from the Internet: <URL: https:/www.usda.gov/foodwaste/faqs>, May 18, 2022, 5 pages.

USDA Food Safety and Inspection Service, "Color of Cooked Ground Beef as It Relates to Doneness", retrieved from the Internet: <URL: https://www.fsis.usda.gov/food-safety/safe-food-handling-andpreparation/ meat-fish/color-cooked-ground-beef-it-relates> retrieved on Sep. 6, 2019, 4 pages.

Yancey J.W. S. et atl., Cookery method and end-point temperature can affect the Warner Bratzler shear force, cooking loss, and internal cooked color of beefsteaks, Meat Science, Elsevier Science, GB, vol. 88, No. 1, Nov. 20, 2010 (Nov. 20, 2010), pp. 1-7.

American Meat Science Association, "AMSA Meat Color Measurement Guidelines, Beef Steak Color Guide—Degrees of Doneness", p. 103, https://meatscience.org/docs/default-source/publications-resources/hottopics/2012_12_meat_clr_guide.pdf, Dec. 2012 (Dec. 2012).

"Oxygen Transmission Rate", PolyPrint, webpage, accessed online Oct. 15, 2025, https://www.polyprint.com/understanding-film-properties/flexographic-otr/ (Year: 2025).

"Water Vapor Transmission Rate", PolyPrint, webpage, accessed online Oct. 15, 2025, https://www.polyprint.com/understanding-film-properties/flexographic-wvtr/ (Year: 2025).

Mintel; Mar. 24, 2011 (Mar. 24, 2011), anonymous: "Parma Ham", XP055800352, Database accession No. 1512997, pp. 1-2 (Database GNPD, online) (Year: 2011).

* cited by examiner

SLICED RARE, MEDIUM RARE AND MEDIUM COOKED ROAST BEEF IN MODIFIED ATMOSPHERE PACKAGING

FIELD

The present invention relates to packaged cooked roast beef products.

SUMMARY

Sliced meat products, such as ham, turkey and fully cooked beef have long been provided in packaging for sale to consumers in grocery stores and the like. Such products often are sold in lidded tray packages that provide a rigid container for a robust packaging system. Such packaging may optionally be hermetically sealed and may even include a modified atmosphere in order to extend shelf life. The modified atmosphere most often includes a gas mixture of carbon monoxide, carbon dioxide, and nitrogen. See, for example, Farber. "Microbiological Aspects of Modified-Atmosphere Packaging Technology-a Review," Journal of Food Protection. Vol. 54. No. I. Pages 58-70 (January 1991).

The use of other modified atmosphere formulations in the context of uncooked cuts of beef are discussed in U.S. Pat. No. 7,935,373 to Brackenridge. In this patent, a modified atmosphere comprising not greater than about 10% carbon monoxide is discussed in the abstract, and various ratios of gases, including mixtures of carbon dioxide, nitrogen and carbon monoxide are discussed, for example, at columns 7 and 8. Various cuts of uncooked beef are described, for example, at column 8, lines 32-36.

Packaging of case-ready fresh beef under modified atmosphere is discussed, for example, in John, L. et al. "Color and thiobarbituric acid values of cooked top sirloin steaks packaged in modified atmospheres of 80% oxygen, or 0.4% carbon monoxide, or vacuum." Meat Science. Aug. 27, 2004.

Presentation of sliced rare, medium rare, and medium cooked roast beef (i.e., beef that has been cooked to an internal temperature of from about 130 to 150° F.) in a packaged format is particularly problematical, because the portions of the meat initially having a desirable pink or somewhat red color tends to quickly change to an undesirable brown color.

At the same time, incorporation of antioxidants, such as butylated hydroxyanisole (BHA) and butylated hydroxytoluene (BHT) is undesirable for a number of reasons. In particular, many customers object to the use of food additives that they perceive to be "artificial."

A method for providing long-shelf life sliced rare, medium rare, and medium cooked roast beef comprises providing whole beef portions; cooking the whole beef portions to an internal temperature of from about 130 to 160° F. to form cooked roast beef portions; slicing the cooked roast beef portions to form sliced cooked roast beef having an average thickness of from about 0.5 mm to 10 mm; disposing the sliced cooked roast beef into a trayless gas impermeable package formed from flexible film, flushing the trayless gas impermeable package with an inert gas comprising carbon dioxide, nitrogen, and from about 0.1% to about 30% carbon monoxide; and sealing the trayless gas impermeable package containing the sliced cooked roast beef and the inert gas.

It has been found that sliced rare, medium rare, and medium cooked roast beef that has been cooked, sliced and packaged in a trayless gas impermeable package that has been flushed with an inert gas as described herein can provide particular advantages in perceived higher quality and product color stability. Moreover, because the present roast beef product can be prepared at a controlled manufacturing facility, the present product can provide an additional degree of comfort in security with respect to safe handling of the product without exposure to deli counter conditions that may have less rigorous procedures. Product safety advantages of preparation of product at a controlled manufacturing facility include both a possible reduced likelihood of cross-contamination of bacteria such as *Listeria monocytogenes* on a slicer used for multiple products in the deli environment, and avoidance of contact with deli service personnel that may reduce the likelihood of community transmission of contagious diseases. Additionally, the present products may be labeled with clear "Use by" or "Sell by" dates that remain with the product, in contrast with deli sourced meat products that may lose association with the appropriate date. Proper association of "Use by" or "Sell by" dates and the accompanying education regarding the importance of these dates may lead to consumption of the present meat product at the optimal time for flavor and, and decreased food waste.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

Figure 1:
FIG. 1 is a top view color photograph of samples of sliced cooked roast beef in trayless gas impermeable packages at Day 0.

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

The whole beef portions used in the present method may be any suitable portions for roasting in presentation as a sliced cooked roast beef. For purposes of the present discussion, whole beef portions are any portions that have not been ground, and are of suitable size for formation of a sliceable portion of beef. Examples of suitable portions include primal, subprimal, retail cuts, and trim cuts of suitable size for formation of a sliceable portion of beef. Examples of beef portions include the shoulder, brisket, rib, flank, round, shank, and sirloin. Further examples of cuts of beef include top sirloin, tri-tip and eye of round.

The whole beef portions are cooked to an internal temperature of from about 130 to 160° F. to form cooked roast beef portions. In an aspect the whole beef portions are cooked to an internal temperature of from about 130 to 140° F. to form rare cooked roast beef portions. In an aspect the whole beef portions are cooked to an internal temperature of from about 140 to 150° F. to form medium rare cooked roast beef portions. In an aspect the whole beef portions are cooked to an internal temperature of from about 150 to 160° F. to form medium cooked roast beef portions.

In an aspect, the amount of cooking of the whole beef portions, and the shelf life of the packaged sliced rare, medium rare, and medium cooked roast beef product can be evaluated by measuring the color attributes of the roasted whole beef portions after slicing under the L*a*b* system using a Minolta Chromameter CR-400 colorimeter (Konica Minolta U.S.A. Inc., Mahwah, N.J.). Hue and saturation additionally can be calculated from data collected in this manner A discussion of evaluation of the color of meat is provided in U.S. Pat. No. 8,158,176 to Steiner, the disclosure of which is incorporated by reference herein. In the present product, five measurements are taken within a one square inch test region located in the middle of a slice of beef taken from the middle of the whole beef portion, and the measurements are averaged to determine the Internal Redness a*/b* Ratio of the sample.

In an aspect, the whole beef portions are cooked to provide cooked roast beef portions having an Internal Redness a*/b* Ratio of from 16 to 22.

The whole beef portions may be cooked using any appropriate technique, such as by roasting, baking or grilling. In an aspect, the whole beef portions may be cooked by a sous vide process to the desired internal temperature. Sous vide cooking advantageously provides excellent, precise control of the internal temperature of the cooked whole beef portions. In an aspect, the whole beef portions are first cooked by a sous vide process, followed by a roasting, baking or grilling step to provide browning on the surface of the meat for a darker surface appearance, and flavor and texture properties at the surface of the beef consistent with those of beef portions cooked only by roasting, baking or grilling.

In an aspect, the sliced cooked roast beef meat is antibiotic-free. In an aspect, the sliced cooked roast beef meat is free of sodium nitrite and sodium nitrate. In an aspect, the sliced cooked roast beef meat is free of added artificial colors and flavors. In an aspect, the sliced cooked roast beef meat is free of artificial preservatives. In an aspect, the sliced cooked roast beef meat is free of reducing agents such as ascorbic acid.

In an aspect, the preparation of the beef comprises smoking or added spices to the meat, before or after cooking.

In an aspect, the whole beef portions are treated with a brine solution prior to cooking. In an aspect, the brine solution comprises sodium phosphates, salt, and vinegar.

In an aspect, the whole beef portions have a pH of from 5.0 to 6.0. In an aspect, the sliced cooked roast beef meat have a pH ranging from 5.3 to 6.3

In an aspect, the whole beef portions are macerated prior to cooking to expose myosin and actin to bind the muscles together. In an aspect, the maceration is carried out by a macerator with a series of rotating blades. In an aspect, the macerated whole beef portions are subjected to mechanical myosin and actin extraction by tumbling, massaging, blending, or mixing.

In an aspect, the whole beef portions are disposed in a casing to form a beef log prior to cooking. Providing the whole beef portions in a casing format advantageously consolidates the meat to a shape and density that facilitates handling during the slicing operation, and additionally in embodiments facilitates preparation of sliced meats having a uniformly sized shape and surface area. In an embodiment, the plastic casing of the beef log is made of plastic polymers. In an embodiment, the fibrous casing of the beef log is made of wood pulp.

In an aspect, the meat is sliced in slice thicknesses of from about 0.5 mm to 10 mm. In an aspect, the meat is sliced in slice thicknesses of from about 0.5 mm to 5 mm, or from 1 mm to 5 mm, or from 2 mm to 4 mm. In an aspect, the meat slices have a major surface area of from about 60 $mm^2$ to about 225 $mm^2$. In an aspect, the meat slices have a major surface area of from about 80 $mm^2$ to about 180 $mm^2$.

The sliced cooked roast beef is disposed into a trayless gas impermeable package formed from flexible film.

In an aspect, each package comprises from about 50 to about 3000 grams of sliced beef. In an aspect, each package comprises from about 50 to about 2000 grams of sliced beef. In an aspect, each package comprises from about 50 to about 1000 grams of sliced beef. In an aspect, each package comprises from about 60 to about 500 grams of sliced beef. In an aspect, each package comprises from about 80 to about 400 grams of sliced beef. In an aspect, each package comprises from about 90 to about 300 grams of sliced beef. In an aspect, each package comprises from about 100 to about 200 grams of sliced beef. In an aspect, each package comprises from about 225 to about 570 grams of sliced beef. In an aspect, each package comprises from about 390 to about 510 grams of sliced beef.

In an aspect, the sliced cooked roast beef is disposed into packages by depositing the sliced cooked roast beef into a package component and assembling the package (e.g. by heat sealing one or more edges of the package) to seal the package around the sliced cooked roast beef. In an aspect, the sliced cooked roast beef is deposited onto a carrier sheet, and the sliced cooked roast beef and carrier sheet are deposited together into a package having a pre-assembled container structure, and the packaged is closed. In an aspect, the sliced cooked roast beef is deposited onto a carrier sheet, and the sliced cooked roast beef and carrier sheet are deposited together into a package component, and the package is assembled (e.g. by heat sealing one or more edges of the package) to seal the package around the sliced cooked roast beef and carrier. In these aspects, the carrier sheet assists in conveying the sliced cooked roast beef in position in the package by providing a surface for receiving the sliced cooked roast beef, and a product configuration that is manipulatable by automated equipment. In an aspect, the carrier sheet is a coated or treated paper sheet. In an aspect, the carrier sheet is bleached (white) or unbleached (brown kraft) material or a kraft paper provided in a color other than white or brown. In an aspect, the carrier sheet comprises paper having a basis weight of from about 1 to 40 pounds per ream. In an aspect, the carrier sheet comprises paper coated with a wax. In an aspect, the carrier sheet comprises paper coated with a wax selected from paraffin or soy based blends of wax. In an aspect, the carrier sheet paper may be coated on one side, or coated on both sides, or the coating may be impregnated into the paper itself. In an aspect, the carrier sheet is made from a material that absorbs grease and/or liquids. In an aspect, the carrier sheet is made from a material that acts as a sanitary barrier for sliced cooked roast beef. In an aspect, the carrier sheet is made from a material that "hides" juices through absorption.

In an aspect, the trayless gas impermeable packages do not contain a rigid packaging component. For purposes of the present invention, a component is considered to be rigid if a sample that is 10 cm long cannot be bent to touch the ends of the sample without damaging or visibly creasing the sample.

The trayless gas impermeable package may be prepared from any material suitable for holding and transporting meat, i.e., are considered safe for food contact. In an aspect, the trayless gas impermeable package is a bag constructed from a barrier material that is essentially impervious to oxygen. For example, in some aspects the trayless gas impermeable package comprises one or more of the following: ethylene/vinyl alcohol copolymer, polyvinyl alcohol homopolymer, polyvinyl chloride, homopolymer and copolymer of polyvinylidene chloride, polyalkylene carbonate, polyamide, polyethylene naphthalate, polyester, polyacrylonitrile, homopolymer and copolymer, liquid crystal polymer, SiOx, carbon, metal, metal oxide, and the like. In an aspect, the trayless gas impermeable package is made from a commercially-available packaging film, such as, for example, CURLON Grade 9602- (Curwood, Oshkosh, Wl, USA). In an aspect, the trayless gas impermeable package may further include an oxygen scavenger. In an aspect, the oxygen scavenger may be provided as an oxygen scavenger packet, such as ACTIVE TECH available from Pactiv LLC, Lake Forest, Illinois, U.S.A.

In an aspect, the flexible film is a plastic film having a thickness of from 10 to 75 micrometers.

In an aspect, the trayless gas impermeable packages are made from a polymeric material having a thickness of from 0.2 mils to 3 mils, or from 0.4 mils to 2.5 mils, or from 1.8 mils to 2.2 mils, or from 1.4 mils to 1.6 mils, or from 0.9 mils to 1.1 mils, or from 0.7 mils to 0.9 mils, or from 0.4 mils to 0.6 mils.

In an aspect, the trayless gas impermeable packages are from about 8 inches to 12 inches wide and from about 6 to about 12 inches in height (including any closure feature). In an aspect, the trayless gas impermeable packages are from about 9 inches to 1 inches wide and from about 8 to about 10 inches in height (including any closure feature).

In an aspect, the trayless gas impermeable packages comprise a closure that is configured to be permanently sealed after various items and substances are placed therein. The mouths of non-resealable bag-type closures include cooperating interlocking or coupling structures, which when engaged together, resist being opened. In some cases, it is known to provide bags having non-resealable bag-type closures with secondary means for gaining access to the contents thereof. For example such bags can include tearable, e.g. perforated, frangible, etc. portions that can be torn apart to gain access to the contents of the bags. An embodiment of this structure is described in U.S. Pat. No. 5,372,428 to Bruno et al. and U.S. Pat. No. 6,004,032 to Kapperman et al., the disclosures of which are incorporated herein by reference.

Prior to sealing the trayless gas impermeable package, the package is flushed with an inert gas comprising carbon dioxide, nitrogen, and from about 0.1% to about 30% carbon monoxide, and sealed to contain the sliced cooked roast beef until opened at the retail outlet or other appropriate location. In an aspect, the inert gas additionally comprises carbon dioxide.

In an aspect, the inert gas comprises the carbon monoxide in an amount of from about 0.1% to about 2%. In an aspect, the inert gas comprises the carbon monoxide in an amount of from about 0.1% to about 1.5. In an aspect, the inert gas comprises the carbon monoxide an amount of from about 0.1% to about 1.0%. In an aspect, the inert gas comprises the carbon monoxide an amount of from about 0.2% to about 0.5%.

In an aspect, the inert gas comprises about 0.4% carbon monoxide, about 35% carbon dioxide, and about 64.6% nitrogen.

In an aspect, the Internal Redness a*/b* Ratio of the packaged cooked, sliced cooked roast beef products does not change more than a value of 2 for a time of 20 days when stored at a temperature of 40° F. (+/−2° F.) during storage. In an aspect, the Internal Redness a*/b* Ratio of the packaged cooked, sliced cooked roast beef products does not change more than a value of 2 for a time of 40 days when stored at a temperature of 40° F. (+/−2° F.) during storage. In an aspect, the Internal Redness a*/b* Ratio of the packaged cooked, sliced cooked roast beef products does not change more than a value of 2 for a time of 60 days when stored at a temperature of 40° F. (+/−2° F.) during storage.

In an aspect, the Internal Redness a*/b* Ratio of the packaged cooked, sliced cooked roast beef products does not change more than a value of 1 for a time of 20 days when stored at a temperature of 40° F. (+/−2 T) during storage. In an aspect, the Internal Redness a*/b* Ratio of the packaged cooked, sliced cooked roast beef products does not change more than a value of 1 for a time of 40 days when stored at a temperature of 40° F. (+/−2° F.) during storage. In an aspect, the Internal Redness a*/b* Ratio of the packaged cooked, sliced cooked roast beef products does not change more than a value of 1 for a time of 60 days when stored at a temperature of 40° F. (+/−2° F.) during storage.

Examples of packages of sliced roast beef are shown in the figures, wherein FIG. 1 is a top view color photograph of samples of sliced cooked roast beef in trayless gas impermeable packages, in modified atmosphere comprising carbon monoxide, oxygen and nitrogen, or in modified atmosphere comprising carbon dioxide and nitrogen at Day 0.

Figure 2:
FIG. 2 is a top view color photograph of samples of sliced cooked roast beef in trayless gas impermeable packages at Day 5.

FIG. 2 is a top view color photograph of samples of sliced cooked roast beef in trayless gas impermeable packages, in modified atmosphere comprising carbon monoxide, oxygen and nitrogen, or in modified atmosphere comprising carbon dioxide and nitrogen at Day 5.

Figure 3:
FIG. 3 is a top view color photograph of samples of sliced cooked roast beef in trayless gas impermeable packages at Day 11.

FIG. 3 is a top view color photograph of samples of sliced cooked roast beef in trayless gas impermeable packages, in modified atmosphere comprising carbon monoxide, oxygen and nitrogen, or in modified atmosphere comprising carbon dioxide and nitrogen at Day 11.

Figure 4:
FIG. 4 is a top view color photograph of samples of sliced cooked roast beef in trayless gas impermeable packages at Day 45.

FIG. 4 is a top view color photograph of samples of sliced cooked roast beef in trayless gas impermeable packages, in modified atmosphere comprising carbon monoxide, oxygen and nitrogen, or in modified atmosphere comprising carbon dioxide and nitrogen at Day 45.

Figure 5:
FIG. 5 is a top view color photograph of samples of sliced cooked roast beef in trayless gas impermeable packages at Day 60.

FIG. 5 is a top view color photograph of samples of sliced cooked roast beef in trayless gas impermeable packages, in modified atmosphere comprising carbon monoxide, oxygen and nitrogen, or in modified atmosphere comprising carbon dioxide and nitrogen at Day 60.

The packages of sliced cooked roast beef in trayless gas impermeable packages in modified atmosphere comprising carbon monoxide, oxygen and nitrogen exhibit superior color stability over time.

In an aspect, the trayless gas impermeable package containing the sliced cooked roast beef and the inert gas (i.e. "the product") is prepared at a controlled manufacturing facility that is physically remote from the point of sale of the product. In an aspect, the controlled manufacturing facility is located at least one kilometer from the point of sale of the product. In an aspect, the controlled manufacturing facility is located at least ten kilometers from the point of sale of the product. In an aspect, the controlled manufacturing facility has a production capacity of at least 1000 packages per eight hours. In an aspect, the controlled manufacturing facility has a production capacity of at least 3000 packages per eight hours. In an aspect, the controlled manufacturing facility has a production capacity of at least 5000 packages per eight hours. In an aspect, the controlled manufacturing facility has a production capacity of at least 10000 packages per eight hours.

Preparation of the product at a controlled manufacturing facility facilitates the sale of the present unique sliced cooked roast beef product at commercial outlets that have heretofore not been able to offer such a convenient and high quality product having exceptional consumer perception of freshness and value. In an aspect, the product is sold in an ecommerce consumer product sales environment with no storefront facility, such as through Amazon™. In an aspect, the product is sold in a mass merchant consumer product sales environment, such as Walmart™ or Target™. In an aspect, the product is sold in a club store consumer product sales environment, such as Costco™ or Sam's Club™. In an aspect, the product is sold in a specialty store consumer product sales environment, such as Whole Foods™ or Trader Joe's™.

EXAMPLES

Example 1. Color Comparison

Roast Beef was cooked and sliced, and placed in the Modified Atmosphere Packaging (MAP) as described herein. Sample A was sliced, cooked roast beef placed in packaging having an MAP of 69.6% Nitrogen (N), 30% Carbon Dioxide ($CO_2$), and 0.4% Carbon Monoxide (CO). Comparative Sample B was sliced, cooked roast beef placed in packaging having a traditional MAP of 70% Nitrogen (N) and 30% Carbon Dioxide ($CO_2$). Comparative Sample C was sliced, bulk Deli Roast Beef as sliced from a deli counter after slicing, which is then placed in a non-barrier package without MAP.

The Sample A roast beef exhibited a red color that was similar to the compared to the color of Comparative Sample C bulk Deli Roast Beef.

Figure 6:
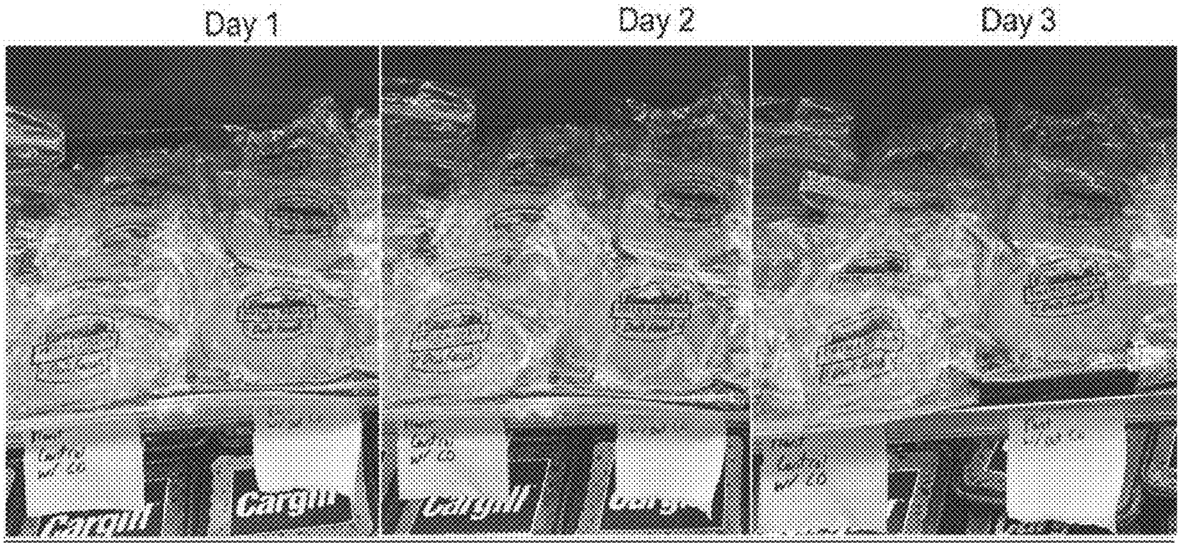
FIG. 6 is a color photograph of samples of sliced cooked roast in trayless gas impermeable packages beef having different inert atmosphere content over a 72 hour period of exposure to lighted retail display.

The samples were then exposed to the light of a lighted retail display for a period of 72 hours at a temperature of from 34 to 38 degrees F. The Sample A roast beef was observed to maintain the red color over time when exposed to the light of a lighted retail display for a period of 72 hours. The Comparative Sample B (MAP without Carbon Monoxide) was less red initially as compared to the Sample A roast beef and also the Comparative Sample C bulk Deli Roast Beef. Comparative Sample B stayed less red for the 72 hour display period. Comparative Sample C bulk Deli Roast Beef was observed to fade over time when exposed to the light of a lighted retail display for a period of 72 hours, resulting in a roast beef product having a color that is comparatively less red. Photographs of the sliced roast beef samples in MAP showing the difference in color during exposure to retail lighting over a period of 72 hours are presented in FIG. 6.

Figure 7:
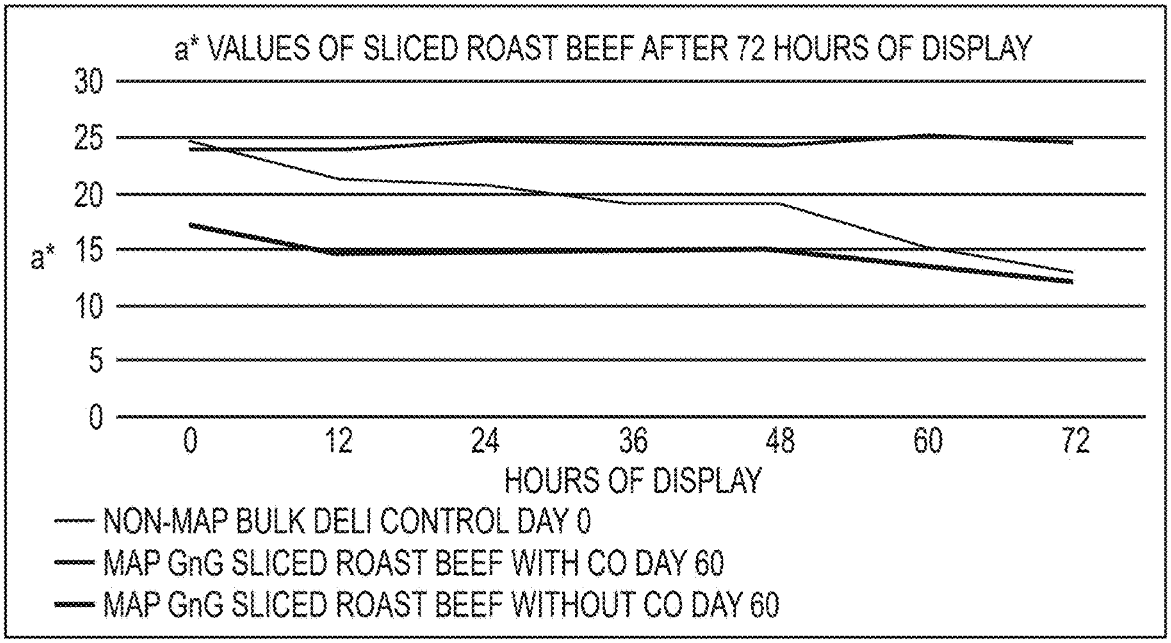
FIG. 7 is a graph showing a* color values of samples of sliced cooked roast in trayless gas impermeable packages beef having different or no inert atmosphere content over a 72 hour period of exposure to lighted retail display.

The color of the sliced roast beef samples was measured by an L*a*b* colorimeter, in particular measuring the a* value that shows differences in red and green of samples being compared. FIG. 7 is a graph showing the change in color of the sliced beef products when exposed to the light of a lighted retail display for a period of 72 hours. As can be seen, in the graph, the a* value of Sample A is relatively constant over the 72 hour time period of exposure to retail display lighting. In contrast, Comparative Sample B having MAP without CO was less red initially as compared to the Sample A roast beef and also the Comparative Sample C bulk Deli Roast Beef. Comparative Sample B stayed less red for the 72 hour display period. Comparative Sample C bulk Deli Roast Beef was observed to fade over time when exposed to the light of a lighted retail display for a period of 72 hours, resulting in a roast beef product having a color that is comparatively less red.

Figure 8:
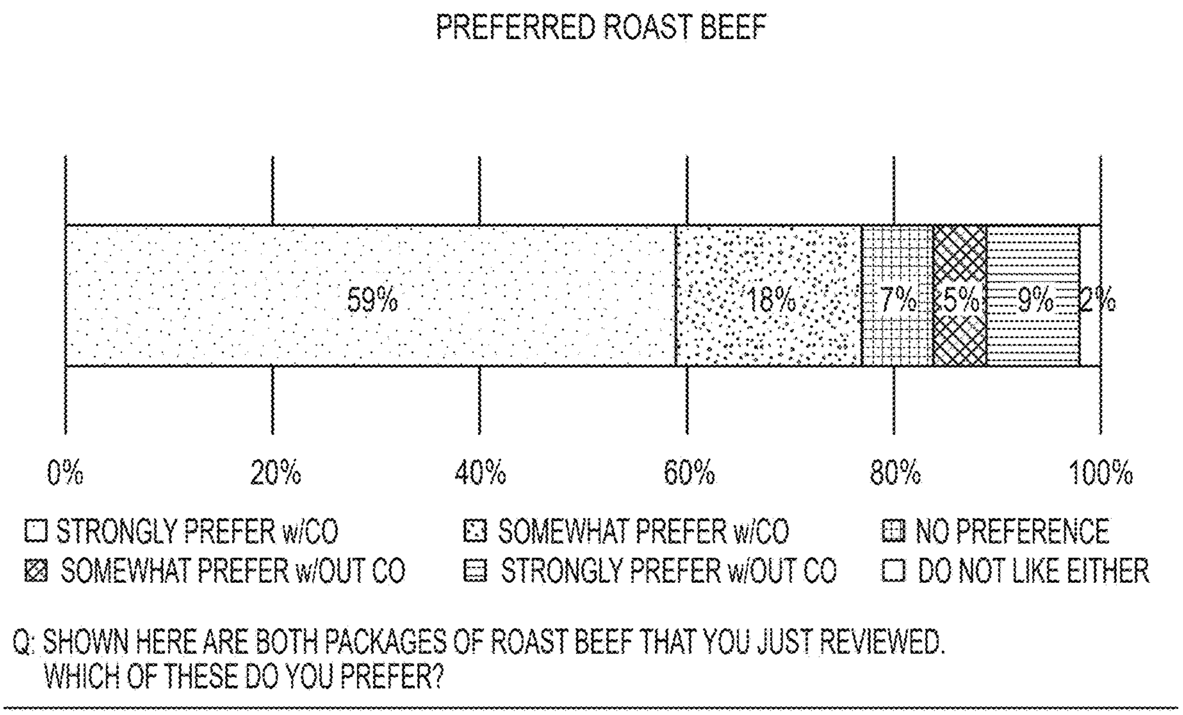
FIG. 8 is a graph showing survey results of color preferences of sliced roast beef products in gas impermeable packages beef having different inert atmosphere content.

The difference in color over time is significant to consumers. A survey of 400 consumers was conducted of roast beef packaged in MAP of 69.6% N, 30% $CO_2$, and 0.4% CO as compared to roast beef product packaged in MAP of 70% N and 30% $CO_2$. When asked to choose a preference, the consumers chose the CO version by more than a 5-to-1 margin, i.e., 77% prefer CO formulation vs. 14% prefer version without CO. See FIG. 8.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of"

and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for providing long-shelf life sliced rare, medium rare, and medium cooked roast beef comprising a) providing whole beef portions;

b) cooking the whole beef portions to an internal temperature of from about 130 to about 160° F. to form cooked roast beef portions;

c) slicing the cooked roast beef portions to form sliced roast beef having an average thickness of from about 0.5 mm to 10 mm;

d) disposing the sliced roast beef into a trayless gas impermeable package formed from flexible film, e) flushing the trayless gas impermeable package with an inert gas comprising carbon dioxide, nitrogen, and from about 0.1% to about 30% carbon monoxide; and f) sealing the trayless gas impermeable package containing the sliced cooked roast beef and the inert gas.

2. The method of claim 1, wherein the whole beef portions are cooked to an internal temperature of from about 130 to 140° F. to form rare cooked roast beef portions.

3. The method of claim 1, wherein the whole beef portions are cooked to an internal temperature of from about 140 to 150° F. to form medium rare cooked roast beef portions.

4. The method of claim 1, wherein the whole beef portions are cooked to an internal temperature of from about 150 to 160° F. to form medium cooked roast beef portions.

5. A method for providing long-shelf life sliced rare, medium rare, and medium cooked roast beef comprising a) providing whole beef portions;

b) cooking the whole beef portions to provide an Internal Redness a*/b* Ratio of from 16 to 22 to form cooked roast beef portions;

c) slicing the cooked roast beef portions to form sliced cooked roast beef having an average thickness of from about 0.5 mm to 10 mm;

d) disposing the sliced cooked roast beef into a trayless gas impermeable package formed from flexible film, e) flushing the trayless gas impermeable package with an inert gas comprising carbon dioxide, nitrogen, and from about 0.1% to about 30% carbon monoxide; and f) sealing the trayless gas impermeable package containing the sliced cooked roast beef and the inert gas.

6. The method of claim 5, wherein the whole beef portions are cooked in step b) to provide an Internal Redness a*/b* Ratio of from 16 to 22 and the Internal Redness a*/b* Ratio of the packaged cooked, sliced cooked roast beef does not change more than a value of 2 for a time of 20 days when stored at a temperature of 40° F. (+/−2° F.) during storage.

7. The method of claim 1, wherein the carbon monoxide is present in an amount of from about 0.1% to about 2%.

8. The method of claim 1, wherein the flexible film is a plastic film having a thickness of from 10 to 75 micrometers.

9. The method of claim 1, wherein the whole beef portions are treated with a brine solution prior to cooking.

10. The method of claim 1, wherein the brine solution comprises sodium phosphates, salt, and vinegar.

11. The method of claim 1, wherein the surface of the whole beef portions are macerated prior to cooking to expose myosin and actin to bind the muscles together, thereby providing macerated whole beef portions.

12. The method of claim 11, wherein the maceration is carried out by a macerator with a series of rotating blades.

13. The method of claim 1, wherein the whole beef portions are disposed in a casing to form a beef log prior to cooking.

14. The method of claim 11, wherein the macerated whole beef portions are subjected to mechanical myosin and actin extraction by tumbling, massaging, blending, or mixing.

* * * * *